United States Patent
Kim et al.

(10) Patent No.: US 7,738,576 B2
(45) Date of Patent: Jun. 15, 2010

(54) COMMUNICATION SYSTEM FOR TRANSMITTING AND RECEIVING A COMMUNICATION SIGNAL HAVING AN INTRA-GUARD-INTERVAL

(75) Inventors: Jae-hyon Kim, Suwon-si (KR); Young-hwan Kim, Hwaseong-si (KR); Seong-soo Lee, Suwon-si (KR); Joonhyuk Kang, Daejeon (KR); Yungil Kim, Daejeon (KR); Hyounkuk Kim, Daejeon (KR); Hyoncheol Park, Daejeon (KR); Jaeseung Son, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 985 days.

(21) Appl. No.: 11/494,729

(22) Filed: Jul. 28, 2006

(65) Prior Publication Data

US 2007/0133694 A1    Jun. 14, 2007

(30) Foreign Application Priority Data

Dec. 8, 2005    (KR) .................. 10-2005-119377

(51) Int. Cl.
*H04K 1/10*    (2006.01)
*H04L 27/28*    (2006.01)

(52) U.S. Cl. .................. 375/260; 375/219; 375/295; 380/263

(58) Field of Classification Search .................. 375/260, 375/295

See application file for complete search history.

(56) References Cited

U.S. PATENT DOCUMENTS 6,510,133 B1 *    1/2003    Uesugi .................. 370/208

OTHER PUBLICATIONS

Yong et al. "UWB-DCSK Communication Systems for Low Rate WPAN Applications", Personal, Indoor and Mobile Radio Communications, 2005. PIMRC 2005. IEEE 16th International Symposium on Berlin, Germany Sep. 11-14, 2005, Piscataway, NJ, USA, IEEE, September 11, 2005. pp. 911-915.*

Su Khiong Yong et al.: UWB-DCSK Communication Systems for Low Rate WPAN Applications, Personal, Indoor and Mobile Radio Communications, 2005. PIMRC 2005, IEEE 16th Internatioanl Symposium on Berlin, Germany Sep. 11-14, 2005, Piscataway, NJ, USA, IEEE, Sep. 11, 2005. pp. 911-915, XP010926637, ISBN; 978-3-8007-29.

(Continued)

*Primary Examiner*—Curtis B Odom
(74) *Attorney, Agent, or Firm*—Sughrue Mion, PLLC (57) ABSTRACT

A communication system which transmits and receives a communication signal having an intra-guard-interval (IGI) inserted is provided. The communication system includes a signal generator which is configured to generate a signal to carry data; and a signal output part which is configured to split a symbol period, which is a transmission unit of the communication signal into a plurality of sections, and to selectively insert the signal which is generated into the plurality of sections, and to output the communication signal.

18 Claims, 9 Drawing Sheets

OTHER PUBLICATIONS

Quek Tony S Q et al.: "UWB Transmitted Reference Signaling Schemes-Part I: Performance Analysis", Ultra-Wideband, 2005, IEEE International Conference on Zurich, Switzerland Sep. 5-8, 2005, Piscataway, NJ, USA, IEEE, Sep. 5, 2008, pp. 587-592, XP010872570, ISBN: 0-7803-9397-X.

Suschik, Mikhail et al. "Chaotic Pulse Position Modulation: a Robust Method of Communicating with Chaos" IEEE Communication Letters, vol. 4, No. 4, Apr. 2000. pp. 128-130.

Maggio, Gian Mario et al. "Pseudo-Chaotic Time Hopping for UWB Impulse Radio" IEEE Transactions on Circuits and Systems I: Fundamental Theory and Applications, vol. 48, No. 12, Dec. 2001. pp. 1424-1435.

Rulkov, Nikolai F. et al. "Digital Communication Using Chaotic-Pulse-Position Modulation" IEEE Transactions on Circuits and Systems I: Fundamental Theory and Applications, vol. 48, No. 12, Dec. 2001, pp. 1436-1444.

\* cited by examiner

COMMUNICATION SYSTEM FOR TRANSMITTING AND RECEIVING A COMMUNICATION SIGNAL HAVING AN INTRA-GUARD-INTERVAL

CROSS-REFERENCE TO RELATED APPLICATIONS

This application claims priority from Korean Patent Application No. 10-2005-0119377, filed on Dec. 8, 2005, in the Korean Intellectual Property Office, the entire disclosure of which is incorporated herein by reference.

BACKGROUND OF THE INVENTION

1. Field of the Invention

Systems consistent with the present invention relate to transmitting and receiving a communication signal having an intra-guard-interval (IGI), and more particularly, to transmitting and receiving a communication signal having an IGI inserted to prevent intra-symbol interference and inter-symbol interference and to prevent performance degradation.

2. Description of the Related Art

Spread spectrum communication is a technology to transmit a signal by spreading the signal's spectrum to a far wider spectrum. Spread spectrum communication includes a method using a narrowband carrier with a certain period as in a code division multiple access (CDMA) scheme, and a method using a wideband carrier. The method using the narrowband carrier modulates the frequency to make the frequency band of the information to be transmitted smaller than the frequency band of the carrier signal. The method using the wideband carrier modulates the frequency to make the frequency band of the information to be transmitted larger than the frequency band of the carrier signal.

The carrier used in spread spectrum communication is typically a sine wave or a pulse. Recently, for the IEEE 802.15.4a standard, a method of transmitting information using a chaotic signal has been suggested.

The IEEE 802.15.4a task group is the location-aware low-power sensor network standardization group. The location-aware low-power sensor networking is a next generation communication technique in which the location awareness capability and the low power are added to the combination of IEEE 802.15.4 ZigBee and IEEE 802.15.3 ultra wide band (UWB) communication.

It is a chaotic signal modulation method that is suggested for the realization of the low power. The chaotic signal modulation can be designed in a simple radio frequency (RF) structure by hardware, and does not require circuits for a voltage controlled oscillator (VCO), phase locked loop (PLL), mixer and the like that have been requisite for existing RF products. Thus, the chaotic signal modulation can reduce the power consumption to 5 mW which is about one third of the preceding power consumption.

Representative modulation schemes of the chaotic signal modulation are a differential chaos shift keying (DCSK) scheme, and a pulse position based-chaotic modulation (PPB-CM) scheme.

The DCSK scheme shows the best bit error rate (BER) characteristics in the chaotic signal modulation. The DCSK scheme utilizes a reference signal. In the symbol duration, two chaotic sample parts corresponding to one data bit are transmitted. The first sample part is used as the reference signal and the second sample part is used as a data signal to transmit. The second sample part is generated by transmitting the reference signal, or by inverting and transmitting the reference signal according to whether a transmitted binary symbol is 0 or 1. In doing so, when the binary symbol is 0, the second sample part, that is, the data signal is generated by reversing the reference signal. When the binary symbol is 1, the data signal is generated by transmitting the reference signal. A receiving side extracts digital data by correlating the received two sample parts.

Figure 1A:
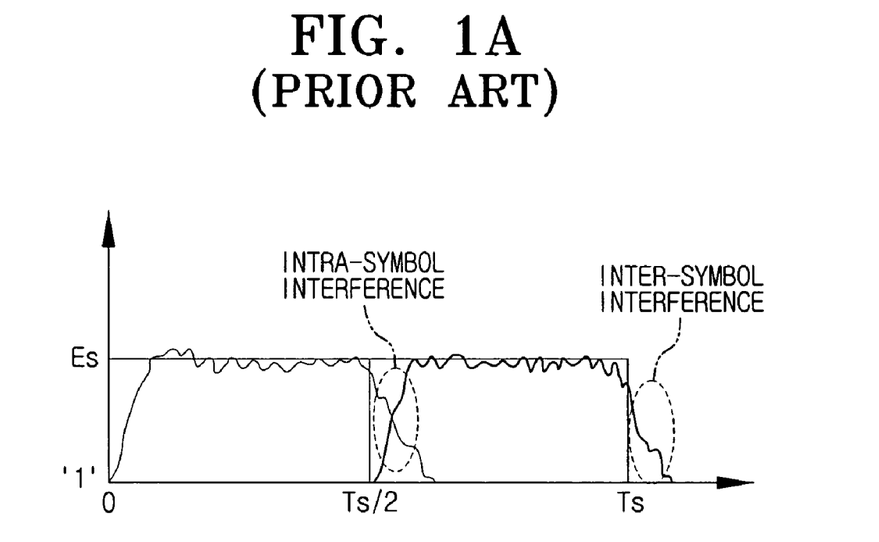
FIGS. 1A and 1B are graphs showing a state of the transmission data signal after passing through a channel according to a DCSK scheme of the related art.
Figure 1B:
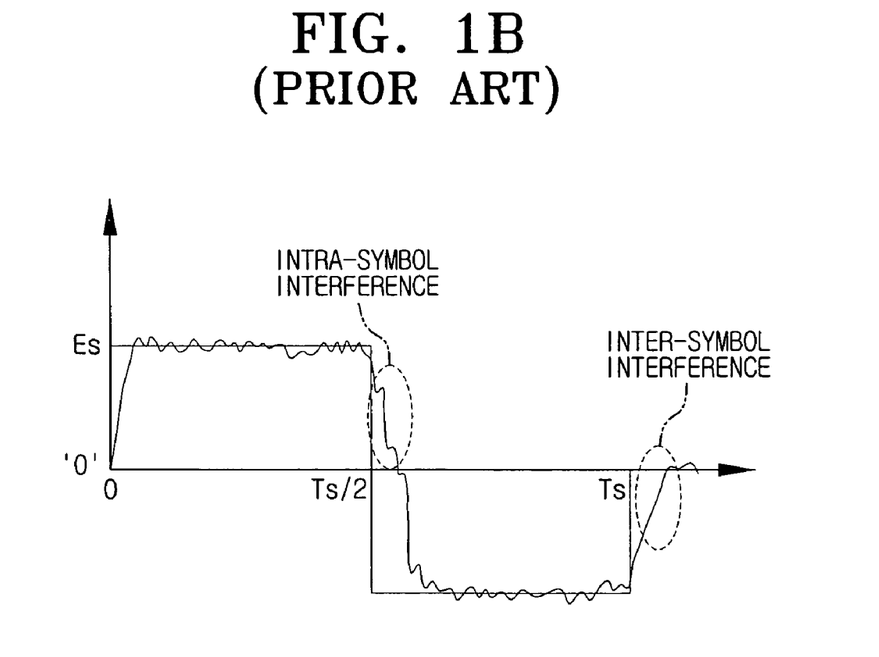

FIGS. 1A and 1B are graphs showing a state of the transmission data signal after passing through a channel according to the DCSK scheme of the related art.

As shown, after passing through the channel, the reference signal and the data signal are received through the multipath. The reference signal smears to the data signal area and interferes with the data signal, and the multipath signal generated in the data signal smears to the reference signal area and interferes with the reference signal of the next symbol duration. As a result, in the related art, a guard interval is inserted between symbols to prevent inter-symbol interference, that is, the interference of the data signal with the reference signal of the next symbol duration. The guard interval is an empty symbol duration which carries no data between the symbols.

The guard interval can reduce inter-symbol interference, but not intra-symbol interference, that is, the interference between the reference signal and the data signal. In practice, when measuring the reference signal and the data signal after passing through the channel at 2.5 Mbps, the channel 37 suffers from intra-symbol interference of 2.73% and the channel 38 suffers from intra-symbol interference of 88.2%.

However, according to the characteristics of the DCSK scheme, since the data is determined depending on the correlation between the reference signal and the data signal, the relationship between the reference signal and the data signal is significant. Thus, the interference between the reference signal and the data signal causes serious performance degradation.

By contrast, the PPB-CM scheme splits the symbol duration into two parts and transmits the chaotic signal in one of the two parts according to whether the binary symbol is 0 or 1. When the binary symbol is 1, the first half of the symbol duration carries the chaotic signal, and when the binary symbol is 0, the second half of the symbol duration carries the chaotic signal. Accordingly, the receiver extracts the digital data based on where the chaotic signal is loaded within the symbol duration.

Figure 2:
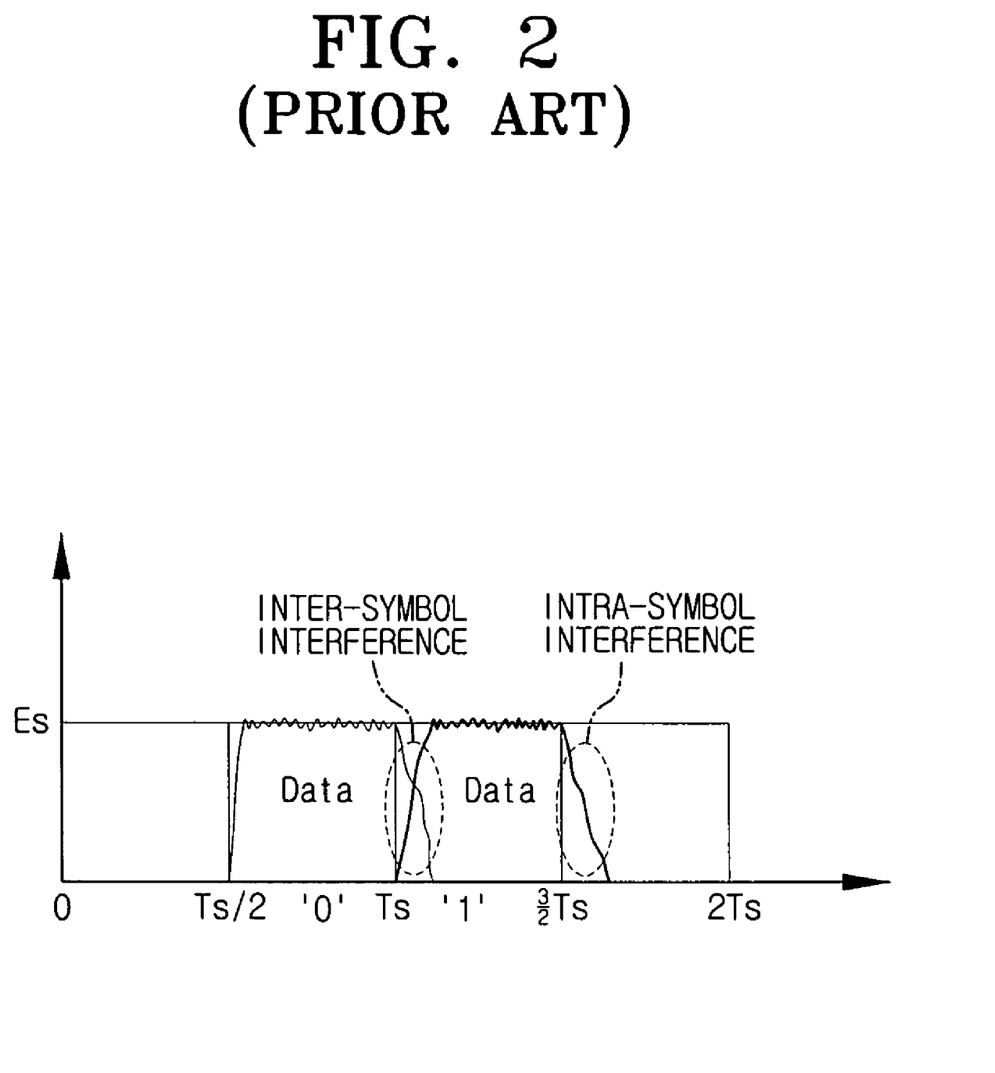
FIG. 2 is a graph showing the state after the chaotic signal, transmitted according to a PPB-CM scheme according to the related art, passes through the channel.

FIG. 2 is a graph showing a state after the chaotic signal, transmitted according to the PPB-CM scheme of the related art, passes through the channel.

As shown in FIG. 2, the chaotic signal corresponding to the binary symbol 0 is loaded in the second half of the symbol duration. When the chaotic signal is received in the multipath, it affects the chaotic signal of the subsequent symbol period. That is, the inter-symbol interference arises. In this case, it is hard to accurately extract the digital data in the subsequent symbol period. The inter-symbol interference can be attenuated by inserting the guard interval between the symbol periods. However, disadvantageously, the insertion of the guard interval extends the transmission time as much as the guard interval.

In contrast, since the chaotic signal of the binary symbol 1 is loaded in the first half of the symbol period, when the chaotic signal is received in the multipath, the signal smears to the second half of the symbol period. That is, the intra-symbol interference arises. Hence, it is hard to accurately extract the digital data in the symbol period.

Such intra-symbol interference appears not only in the DCSK scheme and the PPB-CM scheme using the chaotic signal, but also in most of the modulation schemes using a conventional carrier. Therefore, it is desirable to prevent the intra-symbol interference to thus avoid performance degradation.

SUMMARY OF THE INVENTION

According to an aspect of the present invention, a communication system which transmits and receives a communication signal having an IGI inserted, includes a signal generator which is configured to generate a signal to carry data; and a signal output part which is configured to split a symbol period, which is a transmission unit of the communication signal into a plurality of sections, and to selectively insert the signal which is generated into the plurality of sections, and to output the communication signal.

The signal which is generated may be selectively inserted into the plurality of sections such that a signal section to which the signal generated at the signal generator is inserted, and an interval section having no signal inserted are arranged in an alternating manner within the symbol period.

The signal output part may include a multiplier which is configured to generate a data signal by multiplying the signal generated at the signal generator by a data bit which is a binary symbol of the data.

The signal output part may further include a delayer which is configured to delay the data signal received from the multiplier by a certain period.

The signal output part may further include a switch which is configured to selectively insert into the plurality of sections a first signal section, an interval section, and a second signal section by selecting among the signal from the signal generator, no signal, and the data signal received from the delayer according to a rule.

The rule may be to select the signal from the signal from the signal generator, no signal, and the data signal received from the delayer in sequence.

The switch may comprise a first contact connected to the signal generator, a second contact connected to the delayer, and a third contact receiving no signal.

The switch may connect to the first contact, the third contact, the second contact, and the third contact in sequence within the symbol period, and output the communication signal which carries the signal, no signal, the data signal, and no signal that are repeated in sequence.

The delayer may delay the communication signal by a period which is formed by the signal and no signal.

The signal output part may be a signal position modulator which splits the symbol period into a first half and a second half, splits the first half and the second half into a plurality of sections, respectively, and inserts the signal received from the signal generator into one of the plurality of sections in the first half or the second half.

The signal position modulator may split the first half into a third half and a fourth half, and split the second half into a fifth half and a sixth half.

The signal position modulator may insert the signal into the third half or the fourth half according to a data bit. The fourth half may be the interval having no signal.

The signal position modulator may insert the signal into the fourth half or the sixth half according to a data bit. The fifth half may be the interval having no signal.

The signal generator may be a chaotic signal generator which generates a chaotic signal to carry data.

The signal generator may generate a sine wave or a pulse as a carrier.

According to another aspect of the present invention, a communication system which transmits and receives a communication signal having an IGI inserted, includes a chaotic signal generator which is configured to generate a chaotic signal to carry data; a multiplier which is configured to generate a data signal by multiplying the chaotic signal which is generated by a data bit which is a binary symbol of the data; a delayer which is configured to delay the data signal generated at the multiplier by a certain period; and a switch which is configured to output a communication signal having at least one interval of no signal inserted by selecting among the chaotic signal received from the chaotic generator, no signal, and the data signal received from the delayer according to a rule.

The rule may be to select the chaotic signal, no signal, and the data signal in sequence.

According to another aspect of the present invention, a communication system which transmits and receives a communication signal having an IGI inserted, includes a chaotic signal generator which is configured to generate a chaotic signal to carry data; and a signal position modulator which is configured to split the symbol period to a first half and a second half, to split the first half and the second half to a plurality of sections, respectively, and to insert the chaotic signal received from the chaotic signal generator into one of the plurality of sections in the first half or the second half.

BRIEF DESCRIPTION OF THE DRAWING FIGURES

These and other aspects of the present general inventive concept will become apparent and more readily appreciated from the following description of certain exemplary embodiments, taken in conjunction with the accompanying drawings of which.

DETAILED DESCRIPTION OF EXEMPLARY EMBODIMENTS OF THE PRESENT INVENTION

Reference will now be made in detail to certain exemplary embodiments of the present invention, examples of which are illustrated in the accompanying drawings, wherein like reference numerals refer to the like elements throughout. Exemplary embodiments are described below to explain the present invention by referring to the figures.

Figure 3:
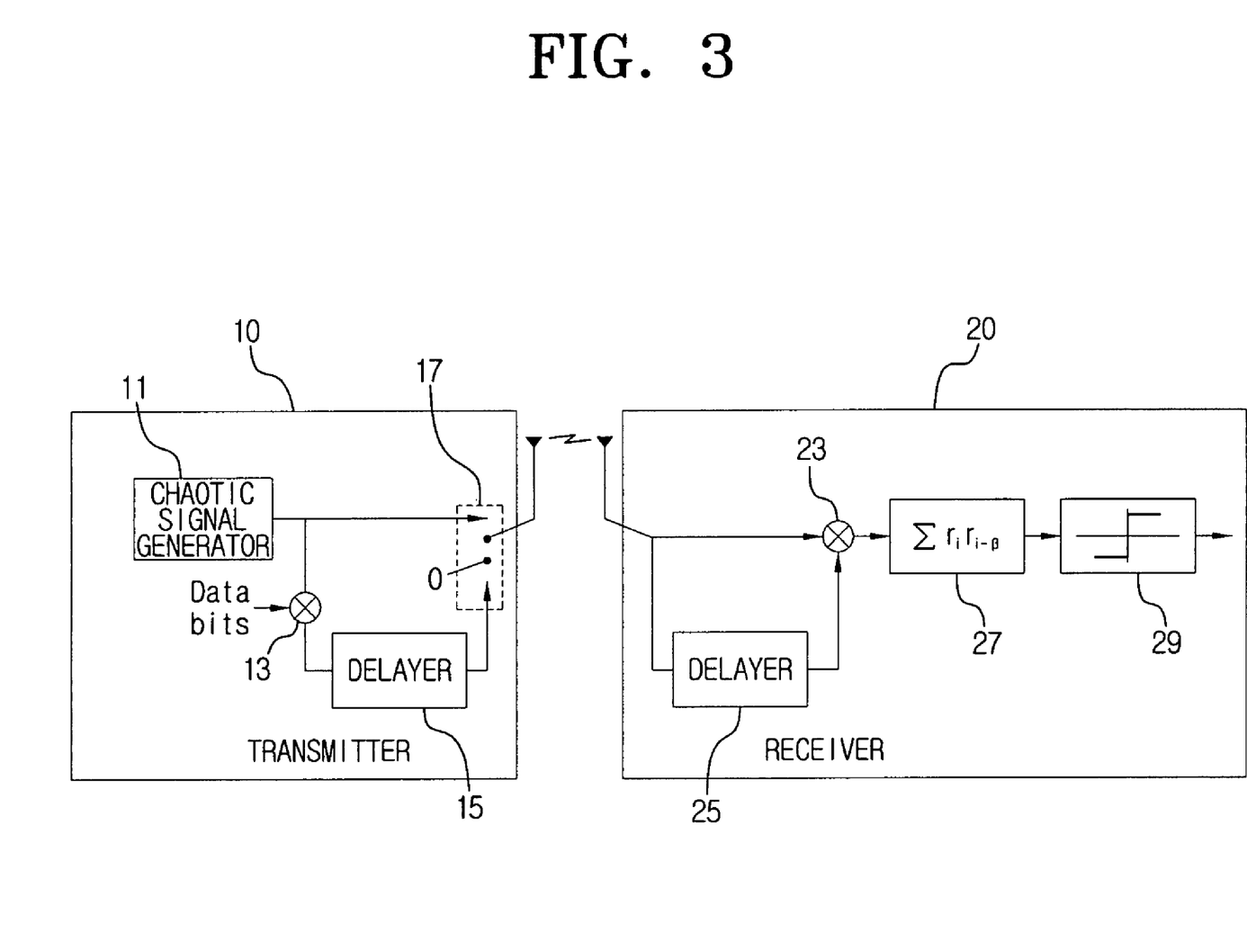
FIG. 3 is a block diagram of a DCSK communication system according to an exemplary embodiment of the present invention.

FIG. 3 is a block diagram of a DCSK communication system according to an exemplary embodiment of the present invention. As shown in FIG. 3, the DCSK communication system includes a transmitter 10 and a receiver 20.

The transmitter 10 includes a chaotic signal generator 11, a multiplier 13, a delayer 15, and a switch 17. The transmitter 10 loads data in a chaotic signal and transmits the chaotic signal to the receiver 20.

The chaotic signal generator 11 generates a chaotic signal having characteristics to carry data. Generally, a chaos dynamic system is utilized. The chaotic signal generator 11 generates the chaotic signal directly in a frequency band for the data transmission, from a preset radio frequency, microwave, infrared ray, visible ray, and ultraviolet ray.

The multiplier 13, which is to generate the data, receives a data bit 0 or 1, multiplies the chaotic signal generated at the chaotic signal generator 11 by the data bit, and feeds the product to the delayer 15. When the data bit is 0, the chaotic signal is reversed, and when the data bit is 1, the chaotic signal is retained. The multiplier 13 generates a data signal by transmitting or reversing a reference signal.

The delayer 15 generates the data signal contained in the second half of the symbol duration by delaying the signal generated at the multiplier 13 by the half of the symbol period.

The switch 17 includes a first contact coupled to the chaotic signal generator 11, a second contact coupled to the delayer 15, and a third contact with no signal. The switch 17 switches to output one of the signal from the chaotic signal generator 11, the signal from the delayer 15, and no signal, and thus generates a signal to be transmitted to the receiver 20. Under control of a controller (not shown), the switch 17 switches the first contact, the third contact, the second contact, and the third contact in that order each during ¼ of the symbol period Ts.

For instance, when the switch 17 connects to the first contact for ¼ Ts, the reference signal is output from the chaotic signal generator 11. When the switch 17 connects to the third contact for ¼ Ts, no signal is generated but an interval is generated. Next, when the switch 17 connects to the second contact, the data signal from the delayer 15 passes through the switch 17 and is output. When the switch 17, connects to the third contact again, no signal is output and an interval is generated.

Figure 4A:
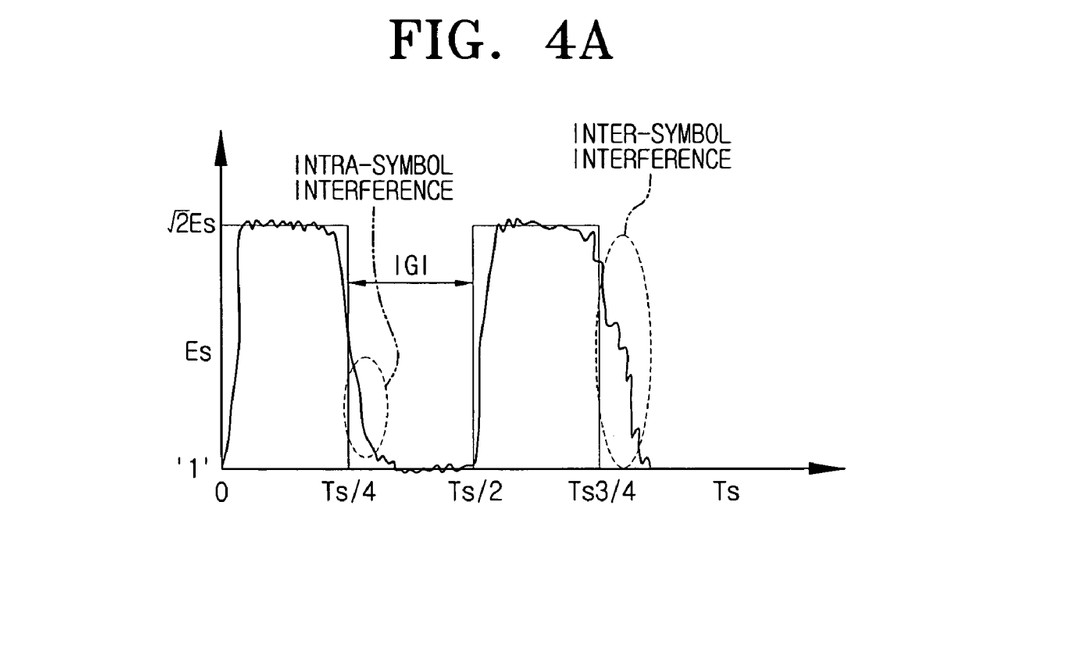
FIG. 4A is a graph showing a communication signal according to an exemplary embodiment of the present invention when the reference signal is the same as the data signal, that is, when the data bit is 1.
Figure 4B:
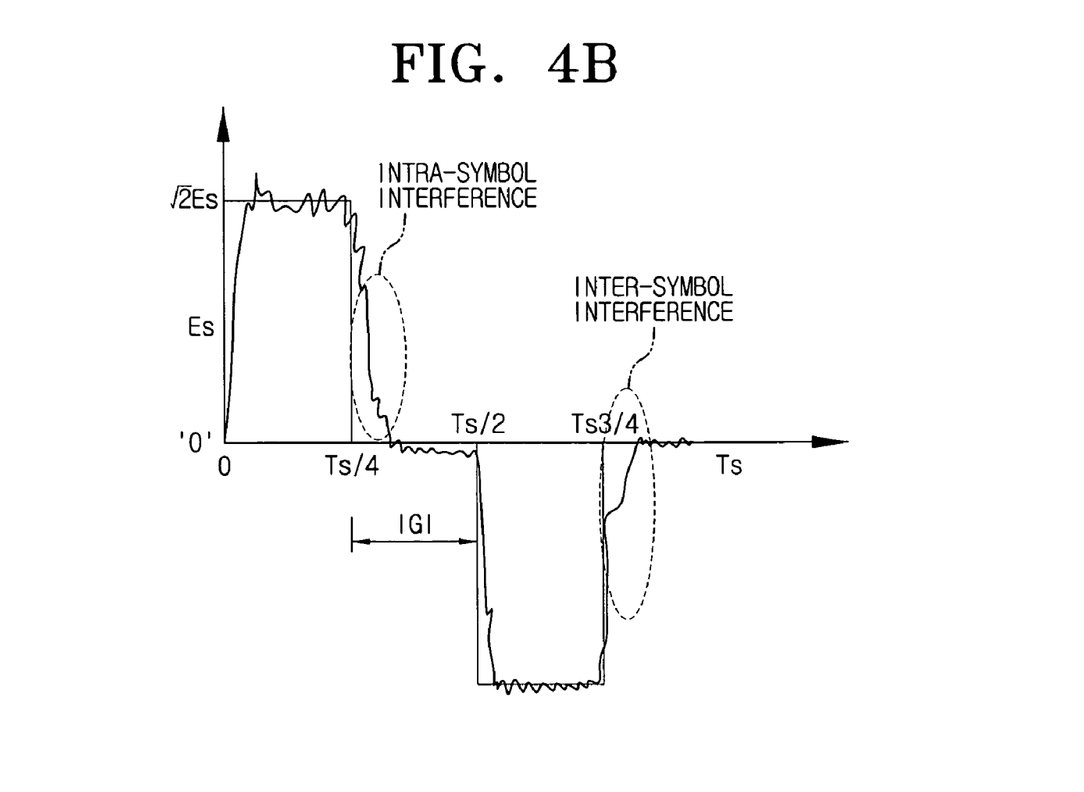
FIG. 4B is a graph showing a communication signal according to an exemplary embodiment of the present invention when the reference signal is the reverse of the data signal, that is, when the data bit is 0.

As a result, a communication signal as shown in FIGS. 4A and 4B is produced from the switch 17. FIG. 4A shows the communication signal when the reference signal is the same as the data signal, that is, when the data bit is 1, and FIG. 4B shows the communications signal when the reference signal is reverse to the data signal, that is, when the data bit is 0.

As such, the interval generated between the reference signal and the data signal by the third contact of the switch 17, is called an intra-guard interval (IGI). The presence of the IGI can prevent interference between the reference signal and the data signal within the symbol. The IGI is inserted following the data signal so that the interference with the subsequent symbol, that is, the inter-symbol interference can be avoided. Additionally, since there is no need to insert the conventional guard interval, the extension of the transmission time, which has occurred due to the insertion of the conventional guard interval, can be prevented.

As no signal is fed to the switch 17, the period of the reference signal and the data signal that are output from the switch 17 can be shortened. Thus, the symbol period carrying the reference signal and the data can be kept the same as usual. Although the width of the IGI is ¼ Ts in FIGS. 4A and 4B for the understanding, the width of the IGI may be larger or smaller. Note that the width of the reference signal and the data signal is adjustable.

The receiver 20 includes a delayer 25, an adder 23, a waveform generator 27, and a data determiner 29.

The delayer 25 delays the communication signal received via an antenna, as much as the delayer 15 of the transmitter 10 has delayed, that is, by ½ Ts. This is to allow determining digital data by comparing the reference signal and the data signal.

The adder 23 adds the signal delayed at the delayer 25 and the communication signal received via the antenna and provides the added signal to the waveform generator 27. When the reference signal and the data signal are the same, that is, the data bit is 1, the communication signal having double energy is output. When the data bit is 0, the communication signal having double negative energy is output since the reference signal and the data signal are contrary to each other.

The waveform generator 27 takes the chaotic signal apart and generates a waveform by adding the communication signal output from the adder 23 by the interval, for example, the symbol period.

The data determiner 29 receives the waveform from the waveform generator 27 and extracts digital data from it. The data determiner 29 determines the digital data according to whether the waveform is over or under a predefined threshold 0. When the waveform is over the threshold, the data determiner 29 determines the digital data 1. When the waveform is under the threshold, the digital data 0 is determined.

Hereafter, descriptions are made of how to transmit data using the chaotic signal in the DCSK communication system according to an exemplary embodiment as constructed above.

The chaotic signal generator 11 generates the chaotic signal, and the generated chaotic signal is fed to the multiplier 13 and the first contact of the switch 17. The multiplier 13 converts the chaotic signal according to the data bit by multiplying the chaotic signal by the data bit. The converted chaotic signal is provided to the delayer 15, delayed by the half period, and fed to the switch 17.

The switch 17 sequentially connects to the first contact, the third contact, the second contact, and the third contact each for ¼ Ts to output the signal from the chaotic signal generator 11, no signal, the delayed signal, and no signal, in that order, during one period. The communication system having the IGI inserted by the switch 17 is transmitted to the receiver 20. The receiver 20 extracts the digital data from the communication signal by performing a certain processing.

Figure 5:
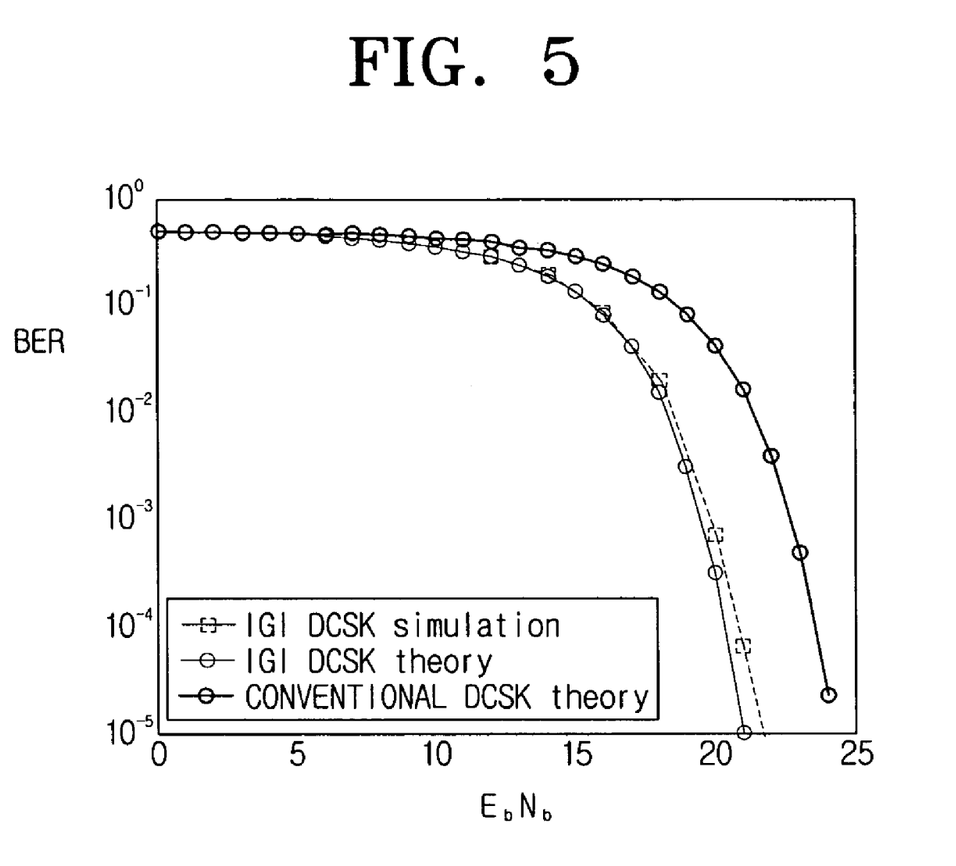
FIG. 5 is a graph comparing the theoretical performance and the simulation result of the DCSK communication system according to an exemplary embodiment of the present invention, and the related art DCSK performance.

FIG. 5 is a graph comparing theoretical performance and a simulation result of the DCSK communication system according to an exemplary embodiment of the present invention, and the conventional DCSK performance. The simulation is conducted under condition that the data rate is 2.5 Mbps, the sampling frequency is 16 GHz, and the channel is the AWGN channel.

Referring to FIG. 5, the theoretical performance of the DCSK scheme substantially matches the simulation result, and shows better performance than the conventional DCSK scheme. Particularly, when the bit error rate (BER) is $10^{-3}$, the performance is enhanced by 2.89 dB. In theory, the performance is enhanced by 3 dB. This result is two times as much as the conventional performance.

Figure 6A:
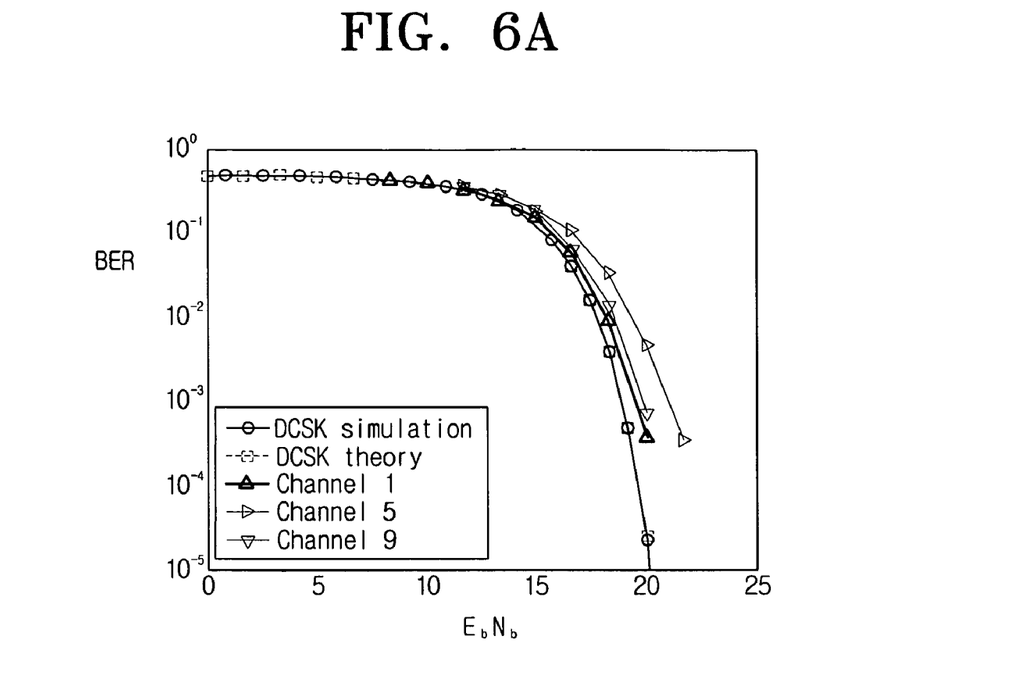
FIG. 6A is a graph showing the theoretical performance and the simulation result of the related art DCSK communication system, and the performance of channels 1, 5 and 9.
Figure 6B:
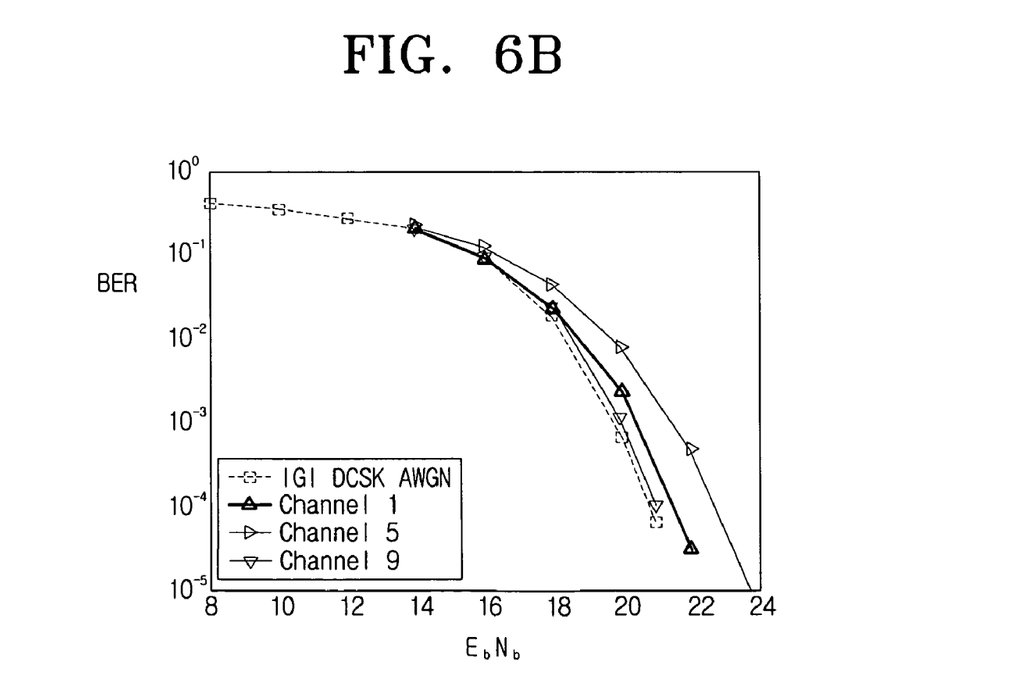
FIG. 6B is a graph showing the theoretical performance and the simulation result of the DCSK communication system according to an exemplary embodiment of the present invention, and the performance of channels 1, 5 and 9.

FIG. 6A is a graph showing the theoretical performance and the simulation result of the conventional DCSK communication system, and the performance of channels 1, 5 and 9, and FIG. 6B is a graph showing the theoretical performance and the simulation result of the DCSK communication system according to an exemplary embodiment of the present invention, and the performance of channels 1, 5 and 9.

Referring now to FIGS. 6A and 6B, the channels 1, 5 and 9 have better performance than the theoretical and the simulation results. The channels 1, 5 and 9 are different from one another in terms of performance. Table 1 shows the results in FIGS. 6A and 6B in number.

TABLE 1

|  | Channel 1 | Channel 5 | Channel 9 |
| --- | --- | --- | --- |
| Conventional DCSK | 23.4 dB | 25.17 dB | 23.76 dB |
| DCSK of present invention | 20.4 dB | 21.5 dB | 20.05 dB |
| Performance enhancement | 3 dB | 3.67 dB | 3.71 dB |

In Table 1, the respective channels are different from one another but have the enhanced performance as a whole. The performance is improved by 3 dB at minimum and by 3.71 dB at maximum when the BER is $10^{-3}$ during the measurement.

Figure 7:
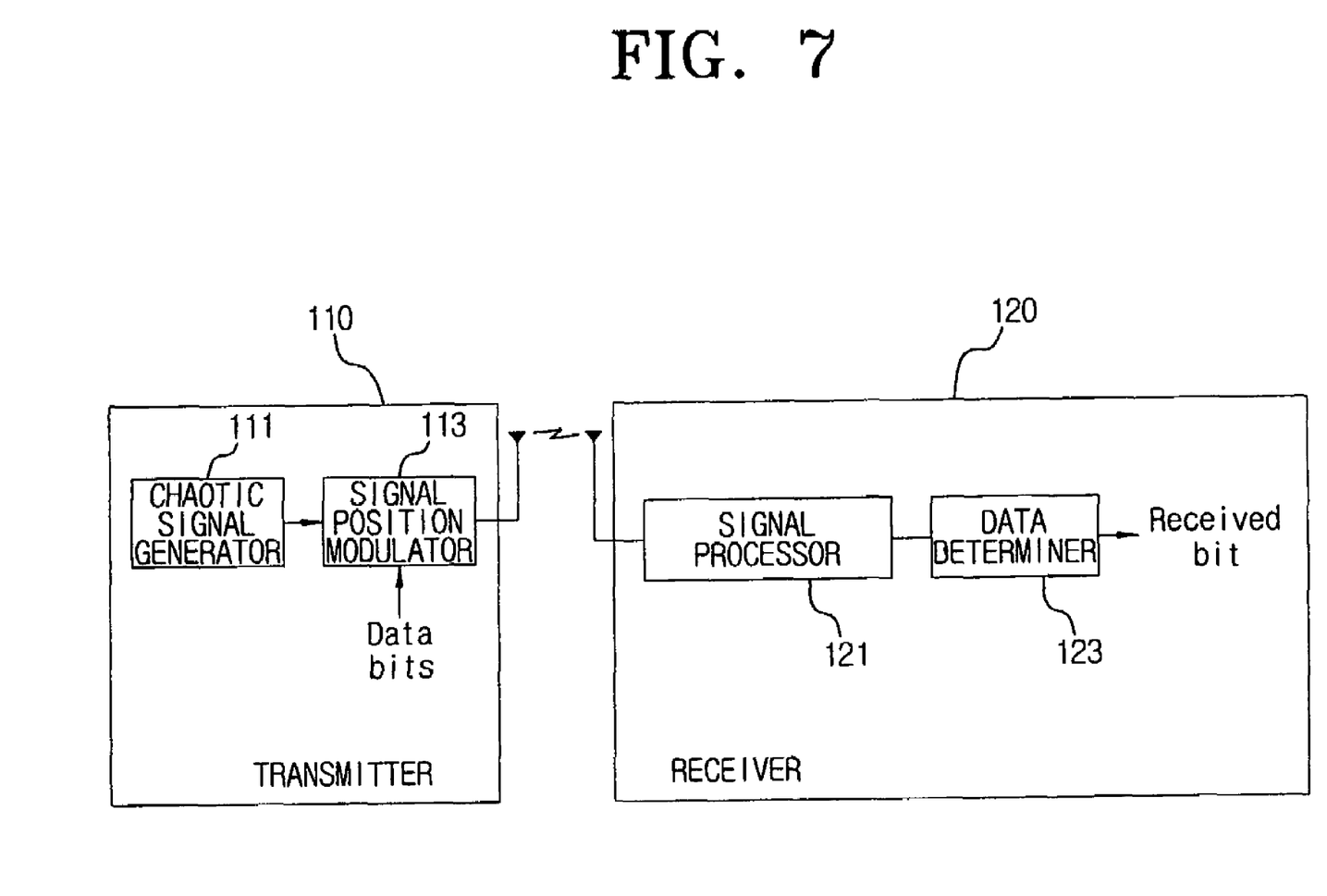
FIG. 7 is a block diagram of a PPB-CM communication system according to an exemplary embodiment of the present invention.

FIG. 7 is a block diagram of a PPB-CM communication system according to an exemplary embodiment of the present invention. As shown in FIG. 7, a transmitter 110 of the PPB-CM communication system includes a chaotic signal generator 111 and a signal position modulator 113.

The chaotic signal generator 111 generates a chaotic signal having characteristics to carry data.

The signal position modulator 113 splits one symbol period into a first half and a second half. The first half is split into a third half and a fourth half, and the second half is split into a fifth half and a sixth half. The signal position modulator 113 inserts the chaotic signal received from the chaotic signal generator 111 in one of the first half and the second half according to a data bit. As for the first half, the chaotic signal is inserted in the third half. As for the second half, the chaotic signal is inserted in the fifth half. Accordingly, the fourth half and the sixth half are the IGI without the insertion of the chaotic signal.

For instance, the signal position modulator 113 inserts the chaotic signal to the fifth half of the symbol period when the data bit 0 is input, and inserts the chaotic signal to the third half of the symbol period when the data bit 1 is input.

In contrast, when the signal position modulator 113 may insert the chaotic signal in the third half of the symbol period when the data bit is 0, and insert the chaotic signal in the fifth half of the symbol period when the data bit is 1.

Figure 8:
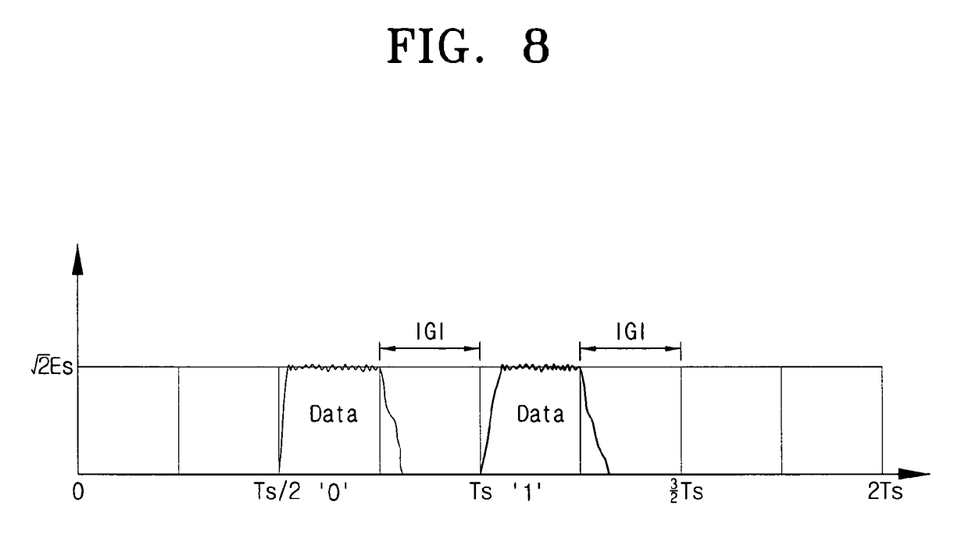
FIG. 8 is a graph showing a state after the chaotic signal, transmitted from a transmitter, passes through a channel in the PPB-CM communication system of FIG. 7.

FIG. 8 is a graph showing a state after the chaotic signal, transmitted from the transmitter, passes through a channel in the PPB-CM communication system of FIG. 7.

In FIG. 8, there are two symbol periods, and the chaotic signal is inserted in the fifth half of the first symbol period and the third half of the second symbol period, respectively. The first symbol period represents the data bit 0, and the second symbol period represents the data bit 1.

The sixth half of the first symbol period and the fourth half of the second symbol period become the IGI having no chaotic signal inserted. The chaotic signal of the first symbol period is spaced apart from the chaotic signal of the second symbol period due to the presence of the IGI. Thus, even when the chaotic signal of the first symbol period is received in the multipath, it is possible to prevent interference with the chaotic signal of the second symbol period.

A receiver 120 includes a signal processor 121 and a data determiner 123.

The signal processor 121 calculates an energy value by adding the chaotic signals of the symbol periods in the received communication signal. In doing so, the signal processor 121 calculates two energy values by adding the chaotic signal in the first half and the chaotic signal in the second half in the respective symbol periods.

The data determiner 123 determines whether the data bit is 0 or 1 by comparing the energy values with respect to the first half and the second half in the symbol period output from the signal processor 121. The data determiner 123 determines the data bit based on information relating to the location relationship between the data bit determined at the signal position modulator 113, and the chaotic signal.

For instance, when the signal position modulator 113 determines to insert the chaotic signal in the second half of the symbol period when the data bit is 1 and to insert the chaotic signal in the first half of the symbol period when the data bit is 0, the data determiner 123 determines the data bits as below.

The data determiner 123 determines the data bit 0 when the energy value of the first half is greater than the energy value of the second half in the symbol period. That the energy value of the first half is greater than the energy value of the second half implies that the chaotic signal is inserted in the first half of the symbol period. This is because the signal position modulator 113 has inserted the chaotic signal in the first half of the symbol period when the data bit is 0. Likewise, the data determiner 123 determines the data bit 1 when the energy value of the second half is greater than the energy value of the first half in the symbol period.

In this exemplary embodiment of the present invention, when the energy value of the first half is equal to the energy value of the second half in the symbol period, the data determiner 123 determines the data bit 1. Alternatively, when the energy value of the first half is equal to the energy value of the second half at the design phase of the communication system, the communication system can be set up to determine the data bit 0.

Figure 9A:
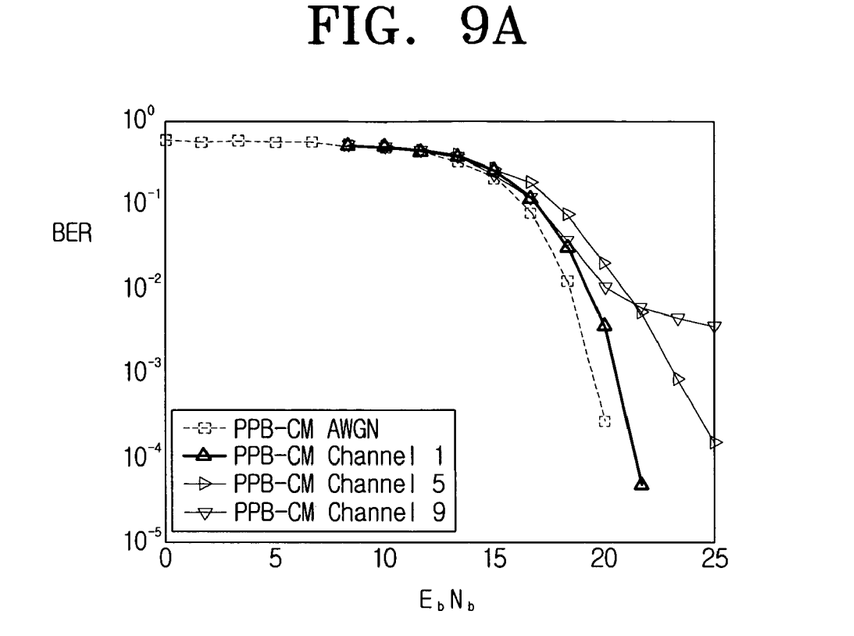
FIG. 9A is a graph showing the theoretical performance and the simulation result of the related art PPB-CM communication system, and the performance of channels 1, 5 and 9.
Figure 9B:
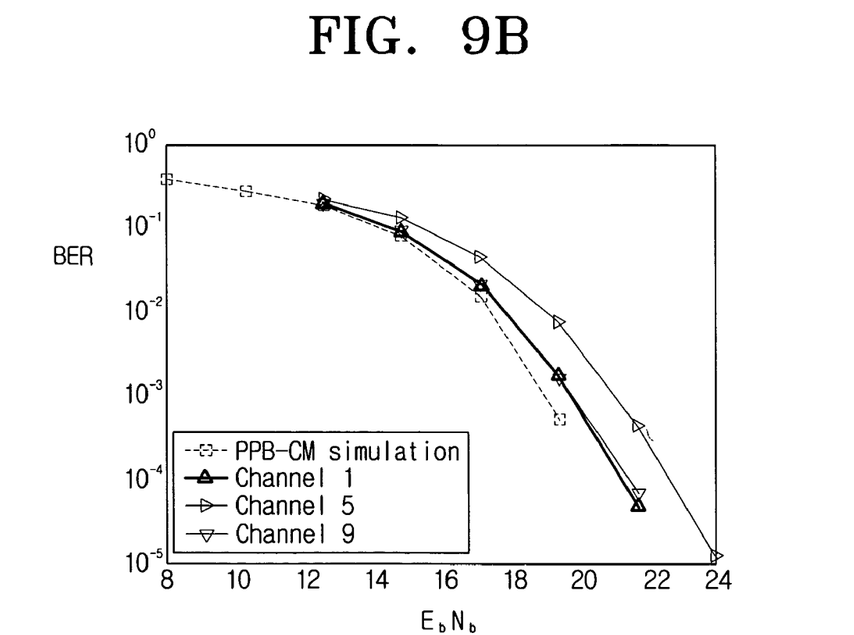
FIG. 9B is a graph showing the theoretical performance and the simulation result of the PPB-CM communication system according to an exemplary embodiment of the present invention, and the performance of channels 1, 5 and 9.

FIG. 9A is a graph showing the theoretical performance and the simulation result of the conventional PPB-CM communication system, and the performance of channels 1, 5 and 9, and FIG. 9B is a graph showing the theoretical performance and the simulation result of the PPB-CM communication system according to an exemplary embodiment of the present invention, and the performance of channels 1, 5 and 9.

Table 2 shows the results in the graphs of FIGS. 9A and 9B in number.

TABLE 2

|  | Channel 1 | Channel 5 | Channel 9 |
|---|---|---|---|
| Conventional PPB-CM | 24.05 dB | 26.51 dB | 30 dB |
| PPB-CM of present invention | 20.34 dB | 21.44 dB | 20.27 dB |
| Performance enhancement | 3.71 dB | 5.07 dB | 9.73 dB |

In Table 2, the respective channels are different from one another but have the enhanced performance as a whole. The performance is improved by 3.71 dB at minimum and by 9.73 dB at maximum when the BER is $10^{-3}$ during the measurement. It is concluded that the PPB-CM scheme with the IGI insertion improves the performance far more than the DCSK scheme.

As such, in the communication system according to exemplary embodiments of the present invention, the DCSK scheme inserts the IGI between the reference signal and the data signal within the symbol period, and the PPB-CM scheme splits the first half and the second half having the chaotic signal in the symbol into two halves and inserts the IGI in one of the two halves. Since not only the intra-symbol interference but also the inter-symbol interference are prevented, the performance can be enhanced. Furthermore, since the IGI is inserted in the symbol period, it is possible to avoid the extension of the transmission time which occurs due to the insertion of the guard interval in the related art.

Although the DCSK communication system has been described in detail, the present inventive concept is applicable to the PPB-CM scheme, the chaotic signal systems, and the typical communication systems using the sine wave or the pulse wave.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A transmitter comprising:
a signal generator which is configured to generate a signal to carry data; and
a signal position modulator which is configured to split a symbol period of a communication signal into a first half and a second half and split the first half and the second half into a plurality of sections, to selectively insert the signal which is generated by the signal generator into the plurality of sections of one of the first half and the second half, and to output the communication signal,
wherein the signal position modulator splits the first half into a first quarter and a second quarter, splits the second half into a third quarter and a fourth quarter, and forms the symbol period by one of:
inserting the signal into one of the first quarter and the third quarter according to a data bit, wherein the second and fourth quarters are intervals having no signal, and
inserting the signal into one of the second quarter and the fourth quarter according to a data bit, wherein the first and third quarters are intervals having no signal.

2. The transmitter as in claim 1, wherein the signal position modulator comprises a multiplier which is configured to generate a data signal by multiplying the signal generated by the signal generator by the data bit which is a binary symbol of the data.

3. The transmitter as in claim 2, wherein the signal position modulator further comprises a delayer which is configured to delay the data signal generated by the multiplier by a certain period.

4. The transmitter as in claim 3, wherein the signal position modulator further comprises a switch which is configured to selectively insert into the plurality of quarters a first signal section, an intra-guard interval section, and a second signal section by alternately selecting the signal from the signal generator, no signal, and the data signal received from the delayer.

5. The transmitter as in claim 4, wherein the switch selects the signal from the signal generator, no signal, and the data signal received from the delayer in sequence.

6. The transmitter as in claim 4, wherein the switch comprises a first contact connected to the signal generator, a second contact connected to the delayer, and a third contact receiving no signal.

7. The transmitter as in claim 6, wherein the switch connects to the first contact, the third contact, the second contact, and the third contact in sequence within the symbol period, and outputs the communication signal which carries the signal, no signal, the data signal, and no signal that are repeated in sequence.

8. The transmitter as in claim 4, wherein the delayer delays the communication signal by a period which is formed by the signal and no signal.

9. The transmitter as in claim 1, wherein the signal to carry data generated by the signal generator is a chaotic signal.

10. The transmitter as in claim 1, wherein the signal generator generates a sine wave or a pulse as a carrier.

11. A receiver comprising:
a delayer, which is configured to delay communication signal which is received from the transmitter of claim 1;
an adder, which is configured to add the signal which is delayed by the delayer and the communication signal which is received;
a waveform generator, which disassembles the signal from the adder by adding the signal output from the adder according to an interval; and
a data determiner, which extracts data from the waveform output from the waveform generator.

12. The receiver as in claim 11, wherein the interval is the symbol period.

13. The receiver as in claim 11, wherein data is extracted according to whether the waveform is over or under a certain threshold.

14. The transmitter as in claim 1, wherein the signal position modulator forms the symbol period by inserting the signal into one of the first quarter and the third quarter according to the data bit, and the second and fourth quarters are intervals having no signal.

15. The transmitter as in claim 1, wherein the signal position modulator forms the symbol period by inserting the signal into one of the second quarter and the fourth quarter according to the data bit, and the first and third quarters are intervals having no signal.

16. A transmitter comprising:
a chaotic signal generator which is configured to generate a chaotic signal to carry data;
a signal position modulator which is configured to split a symbol period of a communication signal into a first half and a second half and split the first half and the second half into a plurality of sections, to selectively insert the chaotic signal which is generated by the signal generator into the plurality of sections of one of the first half and the second half, and output the communication signal, wherein the signal position modulator splits the first half into a first quarter and a second quarter, splits the second half into a third quarter and a fourth quarter, and forms the symbol period by one of:
- inserting the chaotic signal into one of the first quarter and the third quarter according to a data bit, wherein the second and fourth quarters are intervals having no signal, and
- inserting the chaotic signal into one of the second quarter and the fourth quarter according to a data bit, wherein the first and third quarters are intervals having no signal;

a multiplier which is configured to generate a data signal by multiplying the chaotic signal which is generated by the chaotic signal generator by data bit which is a binary symbol of the data;

a delayer which is configured to delay the data signal generated by the multiplier by a certain period; and a switch which is configured to output communication signal having an intra-guard interval of no signal inserted by alternately selecting the chaotic signal received from the chaotic generator, no signal, and the data signal received from the delayer.

17. The transmitter as in claim 16, wherein the switch selects the chaotic signal, no signal, and the data signal in sequence.

18. A communication system comprising:
a transmitter comprising:
  a signal generator which is configured to generate a signal to carry data; and
  a signal output part which is configured to split a symbol period of a communication signal into a first half and a second half and split the first half and the second half into a plurality of sections, to selectively insert the signal which is generated by the signal generator into the plurality of sections of one of the first half and the second half, and to output the communication signal,
  wherein the signal output part splits the first half into a first quarter and a second quarter, splits the second half into a third quarter and a fourth quarter, and forms the symbol period by one of:
    inserting the signal into one of the first quarter and the third quarter according to a data bit, wherein the second and fourth quarters are intervals having no signal, and
    inserting the signal into one of the second quarter and the fourth quarter according to a data bit, wherein the first and third quarters are intervals having no signal,
  such that a signal section to which the signal generated by the signal generator is inserted, and an intra-guard interval section having no signal inserted are arranged in an alternating manner within the symbol period, and
  wherein the communication signal which is output is transmitted;
and
a receiver comprising:
  a delayer, which is configured to delay a received signal;
  an adder, which is configured to add the signal which is delayed by the delayer and the received signal;
  a waveform generator, which disassembles the signal from the adder by adding the signal output from the adder according to an interval; and
  a data determiner, which extracts data from the waveform output from the waveform generator.

* * * * *